United States Patent [19]

Nevitt

[11] Patent Number: 5,184,762
[45] Date of Patent: Feb. 9, 1993

[54] HARNESS FOR CARRYING CONTAINERS

[76] Inventor: Bryant D. Nevitt, 22 Vista del Ponto, San Clemente, Calif. 92672

[21] Appl. No.: 826,484

[22] Filed: Jan. 27, 1992

[51] Int. Cl.⁵ .............................................. A45F 5/00
[52] U.S. Cl. .................... 224/148; 224/191; 224/901; 224/905; 119/96; D30/152
[58] Field of Search ............... 224/148, 905, 191, 901, 224/250; 119/96, 106; D30/152

[56] References Cited

U.S. PATENT DOCUMENTS

| D. 254,698 | 4/1980 | Tawil | D3/71 |
| 262,577 | 8/1882 | Day . | |
| D. 313,677 | 1/1991 | Hammon et al. | D30/152 |
| 417,220 | 12/1889 | Bell | 224/148 |
| 3,089,143 | 5/1963 | Jacobson | 224/259 |
| 4,901,674 | 2/1990 | Bushman et al. | 119/106 |
| 5,060,835 | 10/1991 | Payne | 224/148 |

FOREIGN PATENT DOCUMENTS

| 1088812 | 3/1955 | France | 119/96 |
| 505826 | 5/1939 | United Kingdom | 119/106 |

OTHER PUBLICATIONS

Dog Back Pack; Item G; The Pet Catalog.

Primary Examiner—Linda J. Sholl

[57] ABSTRACT

A light weight, adjustable dog harness enabling a dog to carry at least one container is provided. A vertically disposed, adjustable trunk strap tightly encircles a trunk of the dog. A buckle is included at the ends of the adjustable trunk strap at a point below the belly of the dog such that the strap tightness may be adjusted to accommodate dogs of differing size. A U-shaped, horizontally disposed chest strap encircles the chest area of the dog and is fastened at both ends to the adjustable trunk strap on each side of the dog. A U-shaped vertically disposed, fixed shoulder trunk strap encircles the upper back area of the dog, is located forward of the adjustable trunk strap, and is fastened to the chest strap on each side of the dog. A horizontally disposed back strap is fastened to the adjustable circular trunk strap at one end and to the fixed U-shaped shoulder trunk strap at the other end along the center of the dog's back. The back strap has a ring attached thereto for connection of a leash, or the like. Each strap may be manufactured from a reflective, luminescent, or brightly-colored material. A plurality of container supports, each container support fastened to a trunk strap, is further included. Each supports includes a pair of horizontally disposed ring-shaped straps, aligned with vertical separation, and a U-shaped strap interconnecting the ring-shaped straps, for supporting a container therein. Each support may further include a cylindrical cup, capable of holding a beverage container within, made of a thermal insulating material.

5 Claims, 1 Drawing Sheet

5,184,762

HARNESS FOR CARRYING CONTAINERS

FIELD OF THE INVENTION

This invention relates generally to dog harnesses. More particularly this invention relates to a dog harness with container carriers.

BACKGROUND OF THE INVENTION

When hiking with one's dog, it is frequently desirable to have the dog carry some of the food or beverage that is to be brought along. At the same time, it is also important to be able to secure the dog to a leash from time to time, such as when, for example, another animal is approaching or when one wishes the dog not to wander too far from a camp site. Accordingly, several dog harnesses have been invented with carry sacks attached thereto. Typically, these devices are saddle bag containers that hang over either side of the dog and are supported by straps on the dog's back. Such prior inventions typically include a guide ring attached to the front of a chest strap for attachment of a leash or rope.

Such prior art inventions are usually adequate while in transit, but typically must be removed upon reaching a destination. At such time, a separate collar must be put on the dog to control the dog since prior art harnesses tend to be cumbersome and restricting to the dog's natural movements. Moreover, if the contents of such prior art harnesses are partially removed, such harness devices can become unbalanced, cause discomfort and, in some cases, cause minor injury to the animal such as chaffing. Additionally, prior art harnesses do not take into account a dog's sometimes jarring and erratic movements, which can cause contents in carry sacks of such prior art harnesses to fall out or collide therein and become damaged.

Clearly, then, there is a need for a light weight harness that can be worn by the dog comfortably, even after the dog and owner arrive at their destination, thereby eliminating the need for a separate collar. In addition, such a needed harness would not pose a hindrance or obstruction to the dog's free movement, would hold food or beverage containers securely, and would not become uncomfortably unbalanced when some of the food or beverage containers are removed. The present invention fulfills these needs and provides further related advantages.

SUMMARY OF THE INVENTION

The present invention is a light weight, adjustable dog harness enabling a dog to carry at least one container. A vertically disposed, adjustable trunk strap tightly encircles a trunk of the dog. An attachment means is included at the ends of the adjustable trunk strap at a point below the belly of the dog such that the strap may encircle the trunk of the dog and the strap tightness may be adjusted to accommodate dogs of differing size. A U-shaped, horizontally disposed chest strap may further be included that encircles the chest area of the dog and is fastened at both ends to the adjustable trunk strap on each side of the dog. A U-shaped vertically disposed, fixed shoulder trunk strap may further be included that encircles the upper back area of the dog, is located forward of the adjustable trunk strap, and is fastened to the chest strap on each side of the dog. A horizontally disposed back strap is fastened to the adjustable circular trunk strap at one end and to the fixed U-shaped shoulder trunk strap at the other end along the center of the dog's back. The back strap has a ring attached thereto for connection of a leash, or the like. Each strap may be manufactured from a reflective, luminescent, or brightly-colored material.

The harness further includes a plurality of container supporting means. One of the supporting means is fastened to each side of the dog at the adjustable circular trunk strap and at the fixed U-shaped trunk strap. Preferably, each supporting means includes a pair of horizontally disposed ring-shaped straps, vertically aligned, and a U-shaped strap interconnecting the ring-shaped straps such that inertial forces transferred to the supporting means by movement of the dog causes the rings to ellipsate, thereby tightening the grip of the attachment means onto the container and preventing the container from falling out of the supporting means while the dog is in motion. Each ring-shaped strap further includes an attachment tab for attachment to a trunk strap. Further, each support means may further include a cylindrical cup capable of holding a beverage container within. Such a cylindrical cup may be made of a thermal insulating material for maintaining the temperature of the beverage liquid therein. Alternatively, the cylindrical cup may be made of a transparent material such that the contents of the cup may be readily identified. The supporting means may include a reflective or luminescent material attached thereto for finding the container in low light conditions.

The present invention is convenient to use for transporting containers with a dog. Further, the present invention does not have to be replaced with a conventional dog collar upon reaching a destination, as the harness is light weight, does not obstruct the dog's natural movements, and includes a convenient leash attachment ring. The harness is easy to see at a distance when manufactured with a reflective or luminescent material, thereby providing for the safety of the dog. As the supporting means are located at well-balanced positions on the harness, removing a container from one of the support means will not greatly disturb the balance of the harness, thereby improving the comfort of a dog wearing such a harness. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
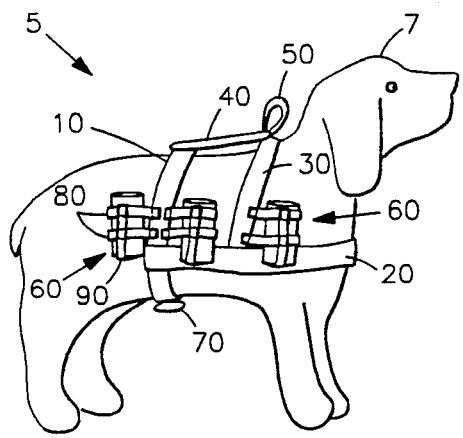
FIG. 1 is a perspective view of the invention, illustrating a harness as worn by a dog and a plurality of container supporting means.
Figures 2, 3:
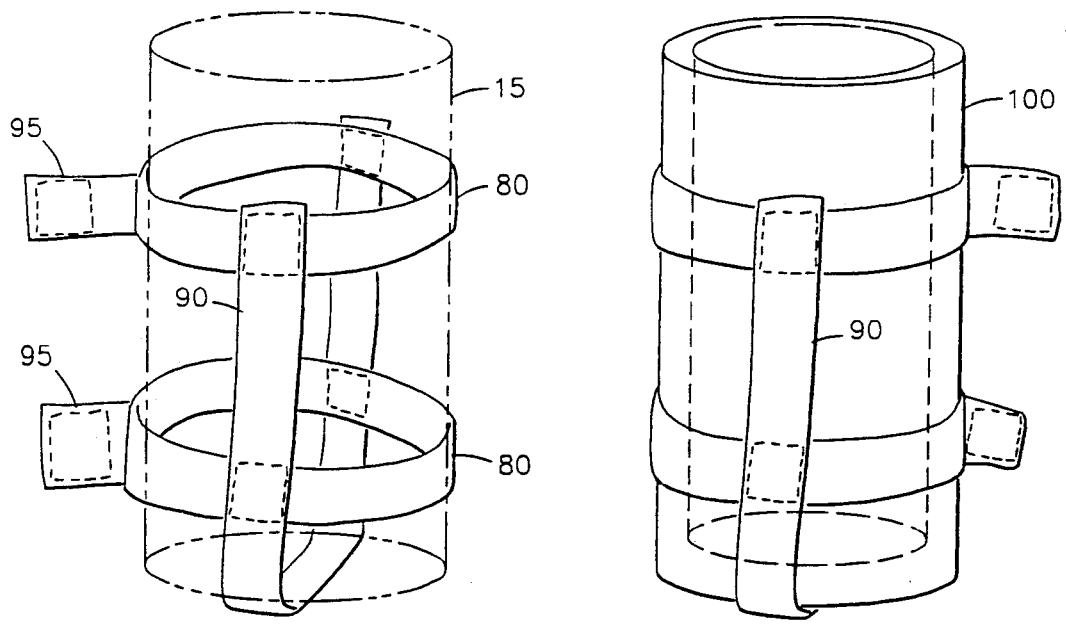
FIG. 2 is a perspective view of the container supporting means of the invention, illustrating a container in phantom outline.
FIG. 3 is a perspective view of a cylindrical cup of the invention.

FIGS. 1 and 2 show an apparatus 5 enabling a dog 7 to carry at least one container 15. A vertically disposed, adjustable, circular trunk strap 10, tightly encircles the trunk of the dog 7. An attachment means 70, such as a conventional strap buckle (not shown), is included at the ends of the adjustable trunk strap 10 at a point below the belly of the dog 7 such that strap 10 encircles the trunk of the dog 7 and such that the strap 10 tightness may be adjusted to accommodate dogs 7 of differing size. A U-shaped, horizontally disposed chest strap 20 is preferably included that encircles the chest area of the dog 7. One end of the chest strap 20 is fastened to the adjustable trunk strap 10 on each side of the dog 7. A U-shaped, vertically disposed, fixed shoulder trunk strap 30 is also preferably included that encircles the upper back area of the dog 7, and is located forward of the adjustable trunk strap 10. One end of the fixed shoulder trunk strap 30 is fastened to the chest strap 20 on each side of the dog 7. A horizontally disposed back strap 40 is fastened to the adjustable trunk strap 10 at one end and to the U-shaped fixed shoulder trunk strap 30 at the other end, along the center of the back of the dog 7. The back strap 40 has a ring 50 attached thereto for connection of a leash (not shown). Each strap 10,20,30,40 may be manufactured of a reflective, luminescent, or brightly-colored material. Alternatively, each strap 10,20,30,40 may include a strip of reflective, luminescent, or brightly-colored material thereon (not shown).

The apparatus 5 further includes a plurality of container supporting means 60. One of the supporting means 60 is fastened to each side of the dog 7 at the adjustable circular trunk strap 10 and at the fixed fixed U-shaped trunk strap 30. Preferably, each supporting means 60 includes a pair of horizontally disposed ring-shaped straps 80, aligned with vertical separation, and a U-shaped strap 90 interconnecting the ring-shaped straps 80 such that inertial forces transferred to the supporting means 60 by movement of the dog 7 causes the ring-shaped straps 80 to ellipsate, thereby tightening the grip of the attachment means 60 onto the container 15. Each ring-shaped strap 80 further includes an attachment tab 95 for attachment to a trunk strap 10,30. Further, each support means 60 may further include a cylindrical cup 100 capable of holding a beverage container 15 therein. Such a cylindrical cup 100 may be made of a thermally insulating material for maintaining the temperature of the beverage liquid therein. Alternatively, the cylindrical cup 100 may be made of a transparent material such that the contents of the cup may be readily identified.

Clearly, the components of the apparatus 5 can be manufactured with a variety of materials, providing that these materials meet the strength requirements of the application in which the apparatus 5 will be utilized. A wide variety of plastics, leathers, canvases, fiber-glasses and metal based materials are available that can accomplish the objectives of the invention. In addition a wide variety of temporary and permanent fastening means are available to secure the various straps 10,20,30,40. In one embodiment of the invention, straps 10,20,30,40 are fastened by sewing; clearly buttons, strong snaps, or Velcro ® type fasteners may also be suitable (not shown).

While the invention has been described with reference to a preferred embodiment, it is to be clearly understood by those skilled in the art that the invention is not limited thereto. Rather, the scope of the invention is to be interpreted only in conjunction with the appended claims.

I claim:

1. An apparatus enabling an animal to carry beverage containers, comprising:

a harness for mounting on the animal, the harness having at least one vertically disposed, adjustable, trunk strap for tightly encircling the body of the animal;

a plurality of means for supporting a cylindrical container, each of the supporting means having a pair of horizontally disposed ring shaped straps aligned one above the other and held in place by a vertical U-shaped strap interconnecting the two rings, the combination forming a support frame for the container to be placed such that the ring shaped straps encircle the container and the U-shaped strap prevents the container from falling out of the ring shaped straps, the container being easily placed into the upper ring shaped strap and then moved vertically into position against the U-shaped strap for carrying;

each of the ring shaped straps having an attachment tab for connecting the supporting means to the harness, the tabs of each of the ring shaped straps being oriented one above the other whereby inertial forces generated by movement of the animal are transferred to the container, the container then urging the ring shaped straps to ellipsate, thereby increasing the holding forces of the ring shaped straps on the container.

2. The apparatus of claim 1 wherein the support means further includes a cylindrical cup capable of holding a beverage container within.

3. The apparatus of claim 2 wherein the cup is made of a thermal insulating material for maintaining the temperature of a beverage in the container.

4. The apparatus of claim 1 wherein the support means further includes a light reflective material positioned on the surface of the support means for finding the container in low light conditions.

5. The apparatus of claim 1 wherein the support means further includes a luminescent material positioned on the surface of the support means for finding the container in low light conditions.

* * * * *